United States Patent
Wang et al.

(10) Patent No.: US 6,532,456 B1
(45) Date of Patent: Mar. 11, 2003

(54) METHODS FOR IDENTIFYING PARTIAL PERIODIC PATTERNS OF INFREQUENT EVENTS IN AN EVENT SEQUENCES

(75) Inventors: Wei Wang, White Plains, NY (US); Jiong Yang, White Plains, NY (US); Philip Shi-lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 203 days.

(21) Appl. No.: 09/585,756

(22) Filed: Jun. 2, 2000

(51) Int. Cl.[7] .................................................. G06F 17/00
(52) U.S. Cl. ....................................................... 706/48
(58) Field of Search ................................ 706/48, 45, 46; 707/500

(56) References Cited

PUBLICATIONS

Jiawei Han; Efficient Mining of Partial Periodic Patterns in Time Series Database; 4/99; IEEE; 0–7695–0071–4/99; 106–115.*

Agrawal et al., "Mining Sequential Patterns", Proceedings of the International Conference on Data Engineering (ICDE), Taipei, Taiwan, pp. 3–14, Mar. 1995.

Han et al., "Efficient Mining of Partial Periodic Patterns in Time Series Database", Proc. Int. Conf. On Data Engineering, 106–115, Apr. 1999.

* cited by examiner

Primary Examiner—John A. Follansbee
Assistant Examiner—Joseph P. Hirl
(74) Attorney, Agent, or Firm—F. Chau & Associates, LLP

(57) ABSTRACT

A method is provided for mining partial periodic patterns in an event sequence, wherein each pattern includes a list of events from the event sequence. At least one subsequence of the event sequence and at least one pattern in the at least one subsequence are identified, such that an information gain of the at least one subsequence with respect to the at least one pattern exceeds a predefined threshold. At least one of the at least one pattern and the at least one subsequence is stored.

25 Claims, 12 Drawing Sheets

METHODS FOR IDENTIFYING PARTIAL PERIODIC PATTERNS OF INFREQUENT EVENTS IN AN EVENT SEQUENCES

CROSS-REFERENCE TO RELATED APPLICATIONS

This application is related to the application 09/585,757 entitled "Methods for Identifying Partial Periodic Patterns and Corresponding Event Subsequences in an Event Sequence", which is commonly assigned and concurrently filed herewith, and the disclosure of which is incorporated herein by reference.

BACKGROUND

1. Technical Field

The present invention generally relates to data mining and, more particularly, to identifying partial periodic patterns in an event sequence. Imperfect patterns may be transformed into perfect patterns through random replacement of events.

2. Background Description

Periodic pattern discovery is an important problem in mining time series data. A periodic pattern is a list of ordered events which repeats itself in an event sequence. Periodic pattern discovery is useful in characterizing the cyclic behavior of time series data. However, in practice, not every portion in the time series data contributes to the repetitiveness of a given pattern(s) in the time series. For example, the stock of a particular company may gain a few points at the beginning of each trading session but may not have much regularity at other times. This type of looser repetitiveness is often referred to as "partial periodicy".

Moreover, due to random noise, a pattern may not always be perfectly repeated. Thus, the event sequence can be viewed as a series of perfect pattern repetitions with a few "random replacements". That is, the event sequence would become a series of perfect repetitions of some pattern after a few replacements (of some of the events in the sequence). If the amount of "replacement" is below some reasonable threshold, the pattern may be considered to be "exhibited" in the event sequence.

The mining of time series data is a newly developing research area. Most of the previous work on mining time series data includes creating a mapping to the association rule mining technique, i.e., each event corresponds to an item and every certain number of consecutive events are treated as a transaction. Metrics referred to as "support" and "confidence" are used to identify significant patterns from the remaining data. The support of a pattern is the number of occurrences of that pattern within a sequence of events. The confidence of a pattern is defined as the fraction specified by the number of occurrences of the pattern within the sequence of events over the length of the sequence. Most association rule mining methods favor frequently occurring events. However, patterns involving infrequent events may also be as significant as (or even more significant than) frequent events in an event sequence. This issue becomes more critical when different events occur at divergent frequencies. As examples, consider the following three illustrative applications.

The first application corresponds to the workload on a cluster of web servers. In the example, the cluster consists of 5 servers, with the workload on each server being measured by the following 4 ranks: low; relatively low; relatively high; and high. Thus, there are $4^5$ (1024) different events, one for each possible combination of server states. Examination of the cluster states over time may show that the fluctuations of the server states comply with some periodic behavior. Obtaining such knowledge would be very beneficial for understanding the behavior of the cluster and for improving its performance.

The second application corresponds to earthquakes. In general, earthquakes are classified by their magnitude and type. Scientists may be interested in knowing whether there exists any inherent seismic period so that future earthquake predictions can be made. Note that patterns involving big earthquakes are much more valuable than patterns involving small earthquakes, even though big earthquakes occur at a much lower frequency than small earthquakes.

The third application is the stock market. Stock investors would like to understand the movement of the stock market so that they can take advantage of the movement to maximize their profits. In the example, the movement of the market on any given day can be categorized by the following descriptions: significant increase; moderate increase; unchanged; moderate decrease; and significant decrease. Even though movements such as significant increase and significant decrease occur less frequently than the other types of movements, the importance of capturing the former types of movements is readily apparent.

The above examples share a common characteristic; that is, different events may exhibit different rates of occurrence. Further, the above examples also show that patterns involving infrequent events are also of great importance. Thus, it would be desirable and highly advantageous to identify any strong tendency incurred by an event (or combination of events). Consider the following event sequence, $a_1\ a_1\ a_1\ a_1\ a_1\ a_2\ a_1\ a_1\ a_2\ a_1\ a_3\ a_2\ a_3\ a_1\ a_3\ a_3\ a_1\ a_3\ a_1\ a_1$. The event $a_1$ occurs 12 times while the event $a_2$ occurs only 3 times. Despite its low frequency, the occurrence of $a_2$ follows a very strong pattern. In particular, an occurrence of $a_2$ is followed by another occurrence of $a_2$ three positions later. This type of tendency or pattern in the event sequence may be very crucial in some application domains.

A closer look will now be taken at the following two patterns $(a_1, *, *)$ and $(a_2, *, *)$, wherein * represents an "eternal event". An eternal event is a virtual event that matches any event. Thus, an eternal event can be used to represent the "don't care" position in a pattern. An eternal event may also be referred to as "non-distinct", in which case an event such as $a_2$ may also be referred to as "distinct". Even though the support of $(a_1, *, *)$ is greater than that of $(a_2, *, *)$ (due to the fact that al occurs much more frequently than $a_2$), no strong tendency is preserved by the occurrence of $a_1$. In the support/confidence model, in order to find pattern $(a_2, *, *)$, the support threshold has to be set lower than 3. In general, this would lead to the examination of a larger number of patterns which do not exhibit a strong tendency (e.g., $(a_1, *, *)$). This indicates that support is not necessarily a proper measurement in evaluating periodic patterns. Thus, a new metric to measure the significance of a pattern needs to be designed to meet this goal. The support/confidence thresholds can be viewed as "absolute" bounds applied to every event irrespective of their occurrence frequencies.

Thus, it would be desirable and highly advantageous to have a new metric for use in data mining which overcomes the deficiencies of the metrics of the prior art. Moreover, it would be desirable and highly advantageous to have a method for identifying significant patterns in subsequences of an event sequence.

SUMMARY OF THE INVENTION

The problems stated above, as well as other related problems of the prior art, are solved by the present invention, a method for identifying partial periodic patterns in event sequences.

According to a first aspect of the invention, there is provided a method for mining partial periodic patterns in an event sequence, wherein each pattern includes a list of events from the event sequence. At least one subsequence of the event sequence and at least one pattern in the at least one subsequence are identified, such that an information gain of the at least one subsequence with respect to the at least one pattern exceeds a predefined threshold. At least one of the at least one pattern and the at least one subsequence is stored.

According to a second aspect of the invention, each of the events in a given pattern is one of distinct and non-distinct, wherein each non-distinct event matches any of the distinct events.

According to a third aspect of the invention, the method further includes the step of determining the information gain of the at least one subsequence with respect to the at least one pattern. The determining step includes the step of dividing the at least one subsequence into contiguous segments, wherein each contiguous segment is a same length as the at least one pattern. For each contiguous segment, the information gain of the contiguous segment is calculated, when all of the events of the contiguous segment match the corresponding events of the at least one pattern. The information loss of the contiguous segment is calculated, when at least one of the events of the contiguous segment does not match the corresponding event of the at least one pattern. The information gain of the at least one subsequence si calculated, by summing the information gain and the information loss of each of the contiguous segments comprised therein.

According to a fourth aspect of the invention, the step of calculating the information gain of each of the contiguous segments includes the steps of assigning an information value to the at least one pattern, and assigning an information loss to at least one deviated pattern from the at least one pattern.

According to a fifth aspect of the invention, the step of assigning an information value to the at least one pattern includes the steps of determining an information value of each of the events in the at least one pattern, and summing the information values of each of the events in the at least one pattern.

According to a sixth aspect of the invention, the step of determining the information value of each of the events in the pattern includes the step of determining a probability of occurrence in the event sequence of each of the events in the pattern.

According to a seventh aspect of the invention, the method further includes the step of replacing at least one of the events in the at least one pattern, to obtain a higher degree of repetitiveness of the events in the at least one pattern with respect to the at least one subsequence.

According to an eight aspect of the invention, the at least one subsequence maximizes the information gain of the at least one pattern with respect to any other subsequences of the event sequence.

According to a ninth aspect of the invention, the step of identifying the at least one subsequence includes the step of identifying a subsequence of the event sequence that maximizes the information gain with respect to a pattern contained therein.

According to a tenth aspect of the invention, there is provided a method for mining partial periodic patterns in an event sequence, wherein each pattern comprising a list of events from the event sequence. Singular patterns are identified in the event sequence, wherein each singular pattern has only one position filled by one of the events in the event sequence. Complex patterns are identified in the event sequence, wherein each complex pattern has more than one position filled by one of the events in the event sequence. The complex patterns and subsequences of the event sequence that comprise the complex patterns are identified, such that an information gain of each of the subsequences with respect to the complex pattern comprised therein exceeds a predefined threshold. At least one of the complex patterns and the subsequences that contain the complex patterns are stored.

These and other aspects, features, and advantages of the present invention will become apparent from the following detailed description of preferred embodiments, which is to be read in connection with the accompanying drawings.

DETAILED DESCRIPTION OF PREFERRED EMBODIMENTS

The present invention is directed to identifying partial periodic patterns in event sequences. Imperfect patterns in an event sequence may be transformed into perfect partial periodic patterns through random replacement of events. The invention is particularly suited for data mining applications, as well as other applications.

It is to be understood that the present invention may be implemented in various forms of hardware, software, firmware, special purpose processors, or a combination thereof. Preferably, the present invention is implemented in software as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Figure 1:
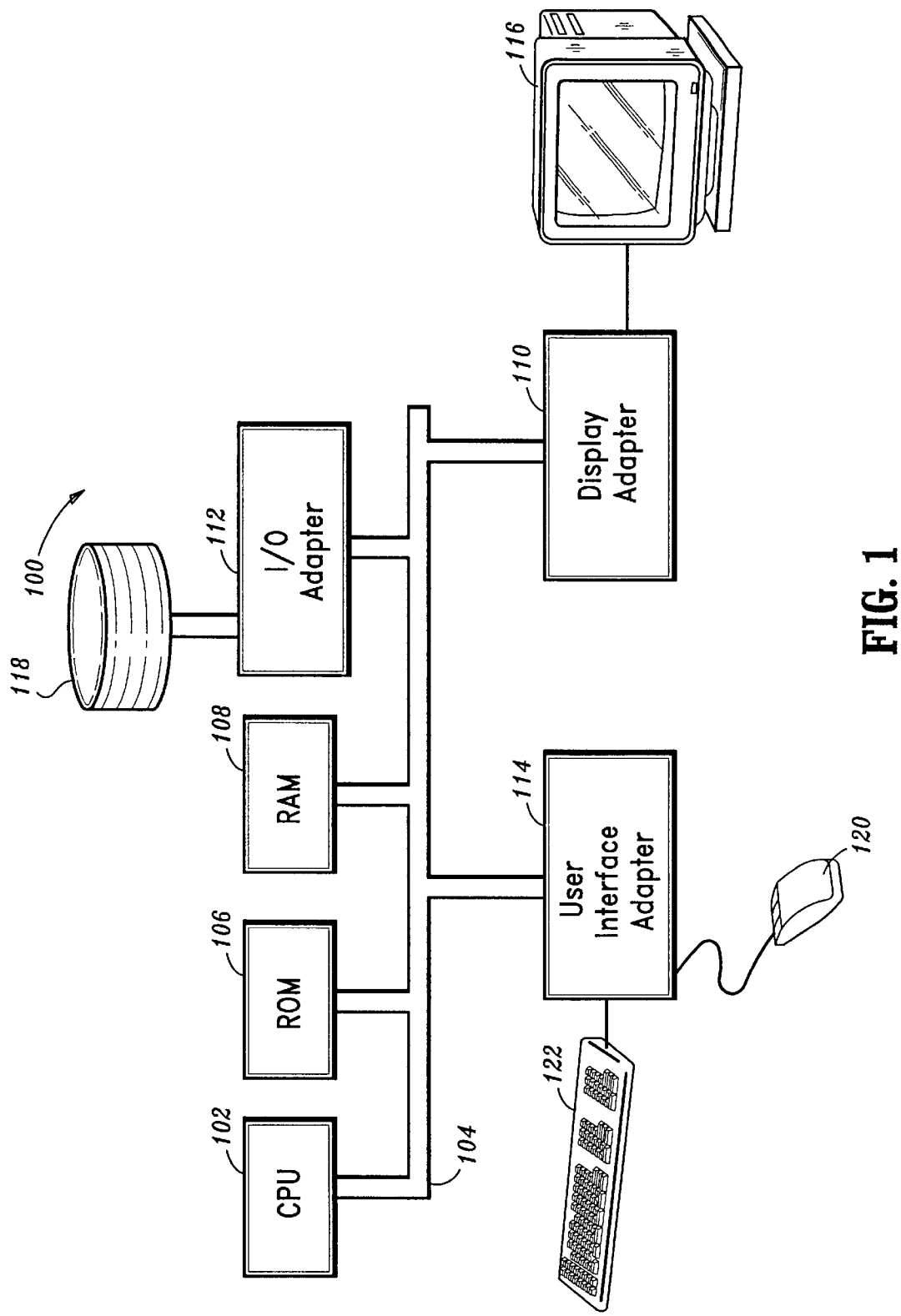
FIG. 1 is a block diagram of a computer processing system 100 to which the present invention may be applied according to an illustrative embodiment thereof.

FIG. 1 is a block diagram of a computer processing system 100 to which the present invention may be applied according to an illustrative embodiment thereof. The computer processing system includes at least one processor (CPU) 102 operatively coupled to other components via a system bus 104. A read-only memory (ROM) 106, a random access memory (RAM) 108, a display adapter 110, an I/O adapter 112, and a user interface adapter 114 are operatively coupled to the system bus 104.

A display device 116 is operatively coupled to the system bus 104 by the display adapter 110. A disk storage device (e.g., a magnetic or optical disk storage device) 118 is operatively coupled to the system bus 104 by the I/O adapter 112.

A mouse 120 and keyboard 122 are operatively coupled to the system bus 104 by the user interface adapter 114. The mouse 120 and keyboard 122 may be used to input/output information to/from the computer processing system 100. It is to be appreciated that other configurations of computer processing system 100 may be employed in accordance with the present invention while maintaining the spirit and the scope thereof.

To facilitate a clear understanding of the invention, a brief description of the invention will now be given, followed by definitions of terms and designations employed herein.

The invention provides a new metric, henceforth referred to as "information gain", to measure the degree of significance of patterns exhibited within a subsequence of data.

The invention also provides an efficient method for mining significant periodic patterns together with their corresponding subsequences.

According to the invention, the model of an imperfect periodic pattern is relaxed by allowing a pattern to be significant during a contiguous portion of the entire sequence. A user is asked to specify the minimum information gain a significant pattern must carry over a subsequence of data. Upon satisfying this requirement, the subsequence (s) that maximizes the information gain of a pattern will be identified. In the previous example, the pattern $(a_2, *, *)$ is very significant in the subsequence $a_2\ a_1\ a_1\ a_2\ a_1\ a_3\ a_2\ a_1\ a_1$, but not over the entire sequence.

Let $t=\{a_1, a_2, \ldots,\}$ be a set of events. A pattern with period l is an array of l events $(p_1, p_2, \ldots, p_l)$, each of which is either an event in t or an eternal event *. The jth position of the pattern is "instantiated" if $p_j$ is an event in t. For any two patterns $P=(p_1, p_2, \ldots, p_l)$ and $p'=(p_1', p_2', \ldots, p_l')$ of the same period 1, P is a "superpattern" of P' (P' is a "subpattern" of P) if $p'_j=*$ or $p_j=p'_j$, for all $1<=j<=1$. Note that an event can appear at multiple positions in a pattern. For example, $(a_1, a_4, *, *, a_4)$ is a pattern of period 5 and its first, second and fifth positions are instantiated. It is also a superpattern of $(a_1, *, *, *, a_4)$. A pattern is called a "singular pattern" if only one position is instantiated. A pattern is called a "complex pattern" if multiple positions are instantiated.

Our model of an imperfect periodic pattern of $(p_1, p_2, \ldots, p_l)$ allows for replacement of a small number of the $p_j$'s in an otherwise perfect repetition of the pattern. That is, according to the invention, an imperfect periodic pattern is a pattern that can be made into a perfect periodic pattern after a few replacements in the event sequence.

For an event $a_j$ and a sequence D of events, let $\text{Prob}(a_j)$ be the expected probability that $a_j$ occurs at any given position in D. Then, the information of $a_j$ with respect to D is defined as $I(a_j)=\log (1/\text{Prob}(a_j))=-\log \text{Prob}(a_j)$. The information of the eternal event * is always 0 since $\text{Prob}(*)=1$. The information of a pattern $P=(p_1, p_2, \ldots, p_l)$ is the summation of the information carried by each individual position. For example, the information of pattern $(a_1, a_4, *, *, a_4)$ is $I(a_1)+I(a_4)+I(*)+I(*)+I(a_4)$. Given a pattern $P=(p_1, p_2, \ldots, p_l)$ and a segment of l events $D'=d_1, d_2, \ldots, d_l$, D' is in compliance with P at position j if and only if either $p_j$ is an eternal event * or $p_j=d_j$, and D' supports P (or P matches D') if D' is in compliance with P at all positions. Given a sequence of N events $D=d_1, d_2, \ldots, d_N$ and a pattern P, the support of P within D is the number of segments $d_{l\times j+1}, d_{l\times j+2}, \ldots, d_{l\times j+1}$ in D that support P. Given a pattern $P=(p_1, p_2, \ldots, p_l)$ with period 1 and a segment of l events $D'=d_1, d_2, \ldots, d_l$, the information loss of D' on position j with respect to P is the information of the event $p_j$ if D' is not in compliance with P at position j and there is no information loss otherwise. The overall information loss of D' with respect to P is the summation of the information loss of each position. Given a pattern P with period l and a sequence D of N ($N>=1$) events: $d_1, d_2, \ldots, d_N$, the information loss of D with respect to P is the summation of the information loss of each segment $d_{l\times j+1}, d_{l\times j+2}, \ldots, d_{l\times j+1}$ with respect to P. The information gain of D with respect to P is defined as $I(P)\times(S_D(P)-1)-L_D(P)$ where $I(P)$, $S_D(P)$, and $L_D(P)$ are the information of P, the support of P within D, and the information loss of D with respect to P, respectively. Given a pattern P, a sequence D and an information gain threshold g, if there exists a subsequence D" of D such that the information gain of D" with respect to P is at least g, then P is a "valid pattern". Consider the event sequence $a_1\ a_1\ a_1\ a_1$ $a_1 \, a_2 \, a_1 \, a_1 \, a_2 \, a_1 \, a_3 \, a_2 \, a_3 \, a_1 \, a_3 \, a_3 \, a_1 \, a_3 \, a_1 \, a_1$. The information of the occurrence of $a_1$ is $-\log_3(12/20)=0.46$ while the information of the occurrence of $a_2$ is $-\log_3(3/20))=1.73$. The information gain of $(a_2, *, *)$ in subsequence $a_2 \, a_1 \, a_1 \, a_2 \, a_1 \, a_3 \, a_2 \, a_3 \, a_1$ is 3.46, while the information gain of $(a_1, *, *)$ in subsequence $a_1 \, a_1 \, a_1 \, a_1 \, a_1 \, a_2 \, a_1 \, a_1 \, a_2 \, a_1 \, a_3 \, a_2$ is 1.38. If g=3 is specified as the information gain threshold, then pattern $(a_2, *, *)$ would satisfy the threshold, but not $(a_1, *, *)$. This is due to the fact that the event $a_1$ occurs much more frequently than $a_2$.

Two properties associated with data mining are the downward closure property and the triangle inequality. The downward closure property may be defined as follows: for three itemsets A, B, and AB, the support of AB is always less than the minimum support of A and B. The triangle inequality may be defined as follows: for three itemsets A, B, and AB, the information gain of AB is less than or equal to the sum of that of A and B.

Although the information gain is a more meaningful metric for the problems addressed previously, it does not preserve the downward closure property (as the support does). For example, the pattern $(a_1, a_2, *)$ may have enough information gain while both $(a_1, *, *)$ and $(*, a_2, *)$ do not. We cannot take advantage of the standard pruning technique developed for mining association rules. The observation that the triangle inequality is still preserved by the information gain motivates us to devise a threefold method.

For any two patterns $p=(p_1, p_2, \ldots, p_1)$ and $P'=(p_1', p_2', \ldots, p_1')$ of the same period 1, P and P' are "complementary" if either $p_j=*$ or $p_j'=*$ for all $1<=j<=1$. A set of patterns of the same period are said to be complementary if every pair of patterns in the set are complementary. Given a set P of complementary patterns of the same period 1, the "minimum common superpattern" (MCSP) of the set P is the pattern P' of period 1, which satisfies the following two conditions:

(1) Each pattern in the set P is a subpattern of pattern P'.

(2) There does not exist another subpattern P" of P' such that each pattern in the set P is also a subpattern of P".

It follows from the definition that the information of the MCSP of a set, P, of complementary patterns is the summation of the information of each pattern in P. For example, $(a_1, a_3, *, *, *)$, $(*, *, *, a_2, *)$, and $(*, *, *, *, a_4)$ are complementary and their MCSP is $(a_1, a_3, *, a_2, a_4)$. The triangle inequality can be stated as, given an event sequence D and a set of complementary patterns P, let Q be the minimum common super pattern of P, then the information gain of D with respect to Q is at most the summation of that of each pattern in P. An example of triangle inequality is that the information gain of $(a_1, a_2, *)$ cannot exceed the summation of that of $(a_1, *, *)$ and $(*, a_2, *)$.

A brief description of the present invention will now be given with respect to FIG. 2. More detailed descriptions of the present invention follow with respect to FIGS. 3–12.

Figure 2:
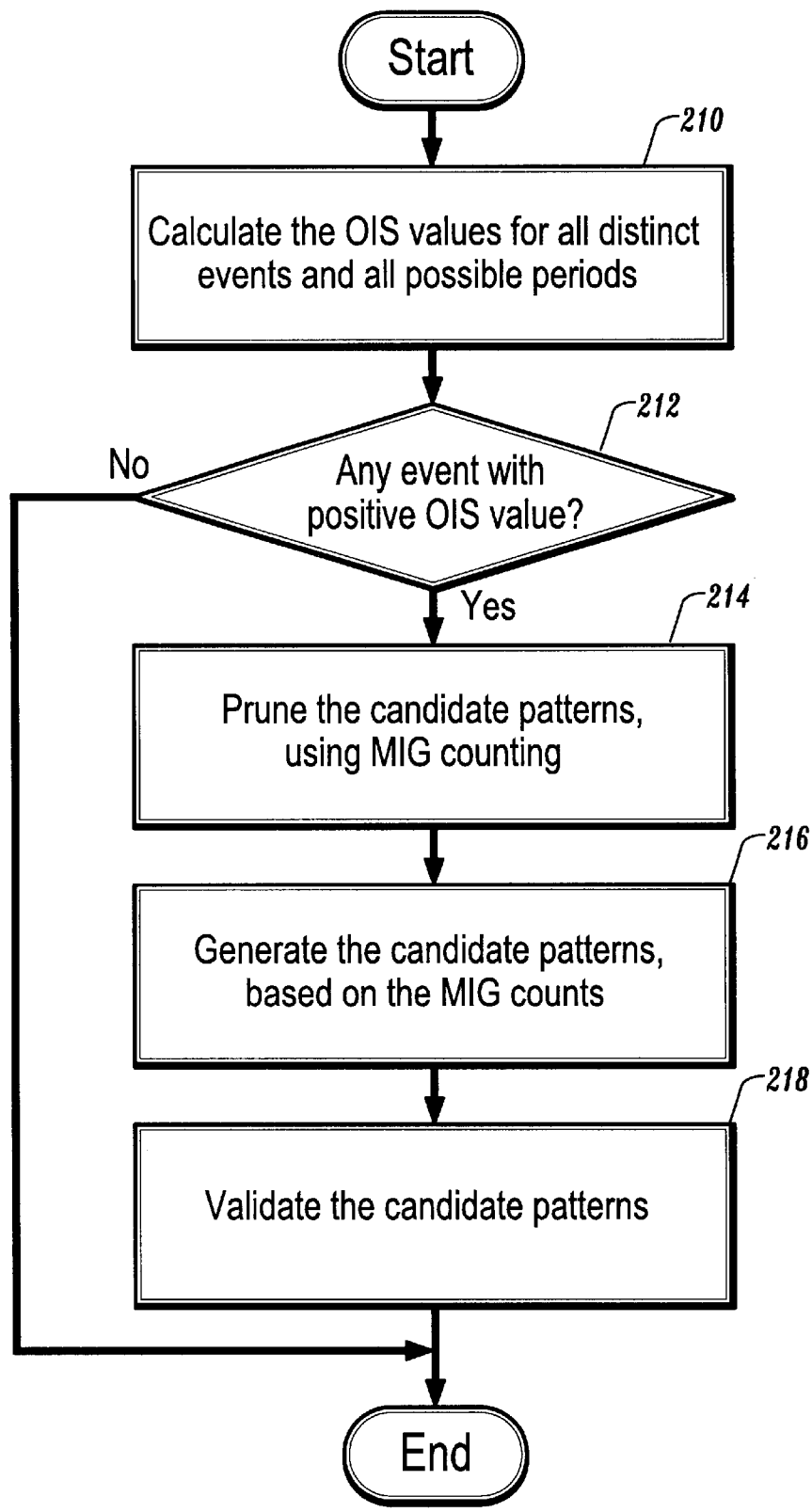
FIG. 2 is a flow diagram illustrating the overall process of mining periodic patterns in an event sequence, according to an illustrative embodiment of the invention.

FIG. 2 is a flow diagram illustrating the overall process of mining periodic patterns in an event sequence, according to an illustrative embodiment of the invention. The optimal information surplus (OIS) values are calculated for all distinct events and all possible periods in a given event sequence (step 210). An OIS value is a bound of the information gain that an event could accumulate for a given period. It is then determined whether an event exists with positive OIS value (step 212). If not, the method is terminated. Otherwise, maximum information gain (MIG) counting is used to further prune the candidate patterns (step 214). A MIG value is a bound of the information gain that an event could accumulate for a given position in a pattern of a given period. The candidate patterns are generated, based upon the MIG counts (step 216). The candidate patterns are then validated (step 218).

Figure 3:
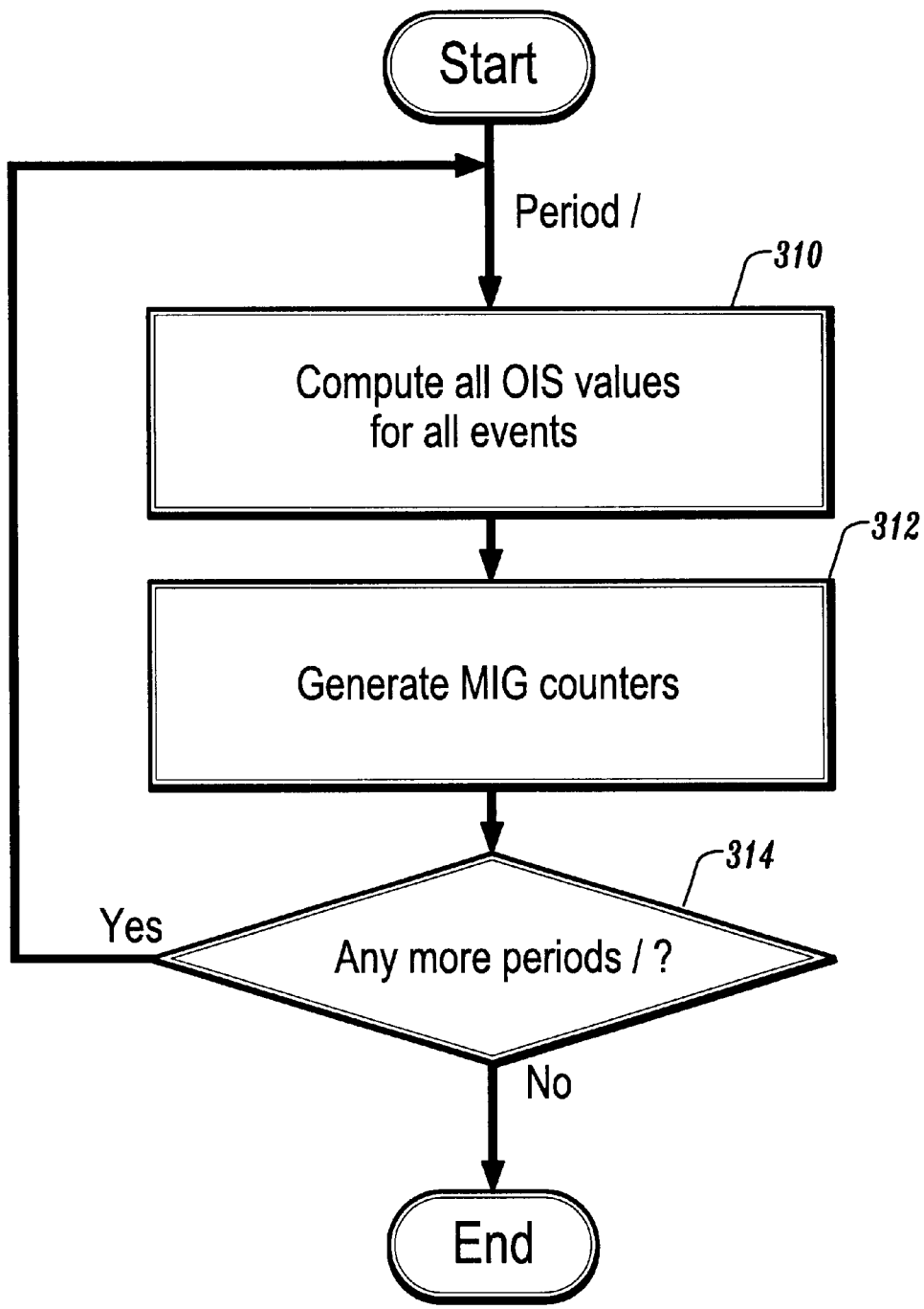
FIG. 3 is a flow diagram illustrating the process of OIS pruning for all events with all possible period lengths (steps 210 and 212 of FIG. 2), according to an illustrative embodiment of the invention.

FIG. 3 is a flow diagram illustrating the process of OIS pruning for all events with all possible period lengths (steps 210 and 212 of FIG. 2), according to an illustrative embodiment of the invention. The method of FIG. 3 (i.e., steps 310 and 312) is repeated for each period 1.

For a period length 1, the OIS values for all events are computed (step 310). Next, the MIG counters are generated (step 312). It is then determined whether there exists any more periods 1 (step 314). If so, the method returns to step 310. Otherwise, the method is terminated.

Figure 4:
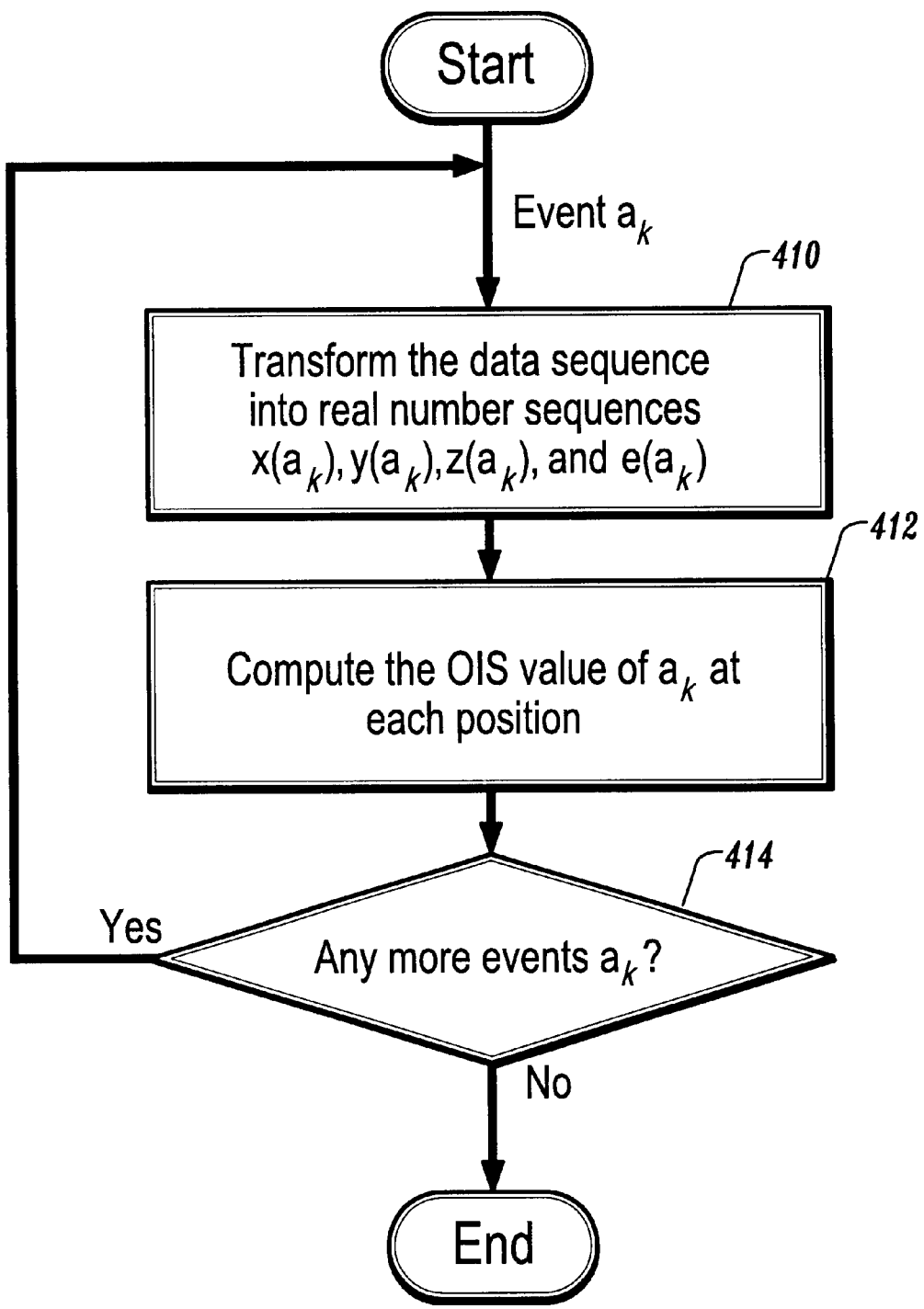
FIG. 4 is a flow diagram illustrating the process of computing OIS values for all events with a given period length 1 (step 310 of FIG. 3), according to an illustrative embodiment of the invention.

FIG. 4 is a flow diagram illustrating the process of computing OIS values for all events with a given period length 1 (step 310 of FIG. 3), according to an illustrative embodiment of the invention. The method of FIG. 4 (i.e., steps 410 and 412) is repeated for each distinct event $a_k$.

For a distinct event $a_k$, the input event sequence is transformed into four sequences of real numbers, $x(a_k)$, $y(a_k)$, $z(a_k)$, and $e(a_k)$ (step 410). The OIS value of $a_k$ is computed at each position in the period (step 412). It is then determined whether there exists any more distinct events $a_k$ (step 414). If so, the method returns to step 410. Otherwise, the method is terminated.

Figure 5:
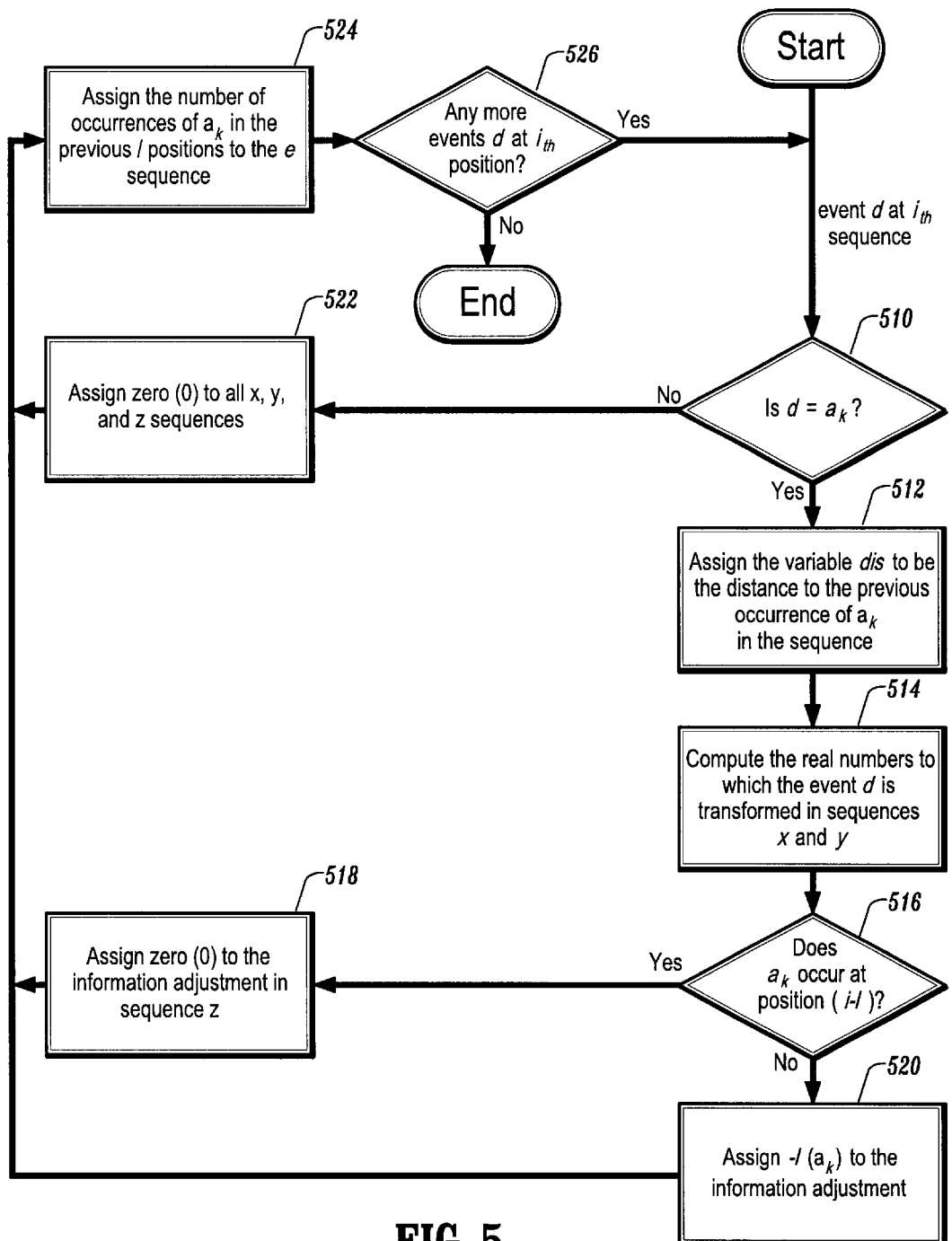
FIG. 5 is a flow diagram illustrating the process of transforming the input event sequence into four sequences of real numbers (step 410 of FIG. 4), according to an illustrative embodiment of the invention.

FIG. 5 is a flow diagram illustrating the process of transforming the input event sequence into four sequences of real numbers (step 410 of FIG. 4), according to an illustrative embodiment of the invention. The method of FIG. 5 (i.e., steps 510 through 524) is repeated for each event d occurring at the ith position in the sequence.

The four sequences of real numbers are designated as x, y, z, and e, as shown at step 410 of FIG. 4. These four sequences capture the information loss, information, information adjustment, and the number of occurrences of ak in previous l positions in the event sequence, respectively, for each position of the event sequence. According to the method of FIG. 5, each event in the sequence is examined sequentially.

For an event d occurring at the ith position in the sequence, it is determined whether d is $a_k$ (step 510). If d is not $a_k$, then the method proceeds to step 522. However, if d is $a_k$, then the method proceeds to step 512.

At step 512, the variable dis is assigned to be the distance to the previous occurrence of $a_k$ in the sequence. The real numbers to which the event d is transformed in sequences x and y are computed (step 514). Step 514 can also be represented as follows:

$x(a_k,l,i) \leftarrow -\lceil (\text{dis}-l)/l \, I(a_k)$ $y(a_k,l,i) \leftarrow -I(a_k)$ Then, it is determined whether event $a_k$ also occurred at position (i−1) in the event sequence (step 516). If so, zero is assigned to the information adjustment in the z sequence $z(a_k,l,i))$ (step 518), and the method proceeds to step 524. Otherwise, $-I(a_k)$ is assigned to the information adjustment in the z sequence (i.e., $z(a_k,l,i)$) (step 520), and the method proceeds to step 524.

At step 522 (d is not $a_k$, at step 510), zero is assigned to all x, y, and z sequences (i.e., $x(ak,l,i)$, $y(a_k,l,i)$, $z(a_k,l,i)$), and the method proceeds to step 524. At step 524, the number of occurrences of $a_k$ in previous l positions is assigned to the e sequence (i.e., $e(a_k,l,i)$).

It is then determined whether there exists any more events d occurring at the ith position in the sequence (step 514). If so, the method returns to step 510. Otherwise, the method is terminated.

Figure 6:
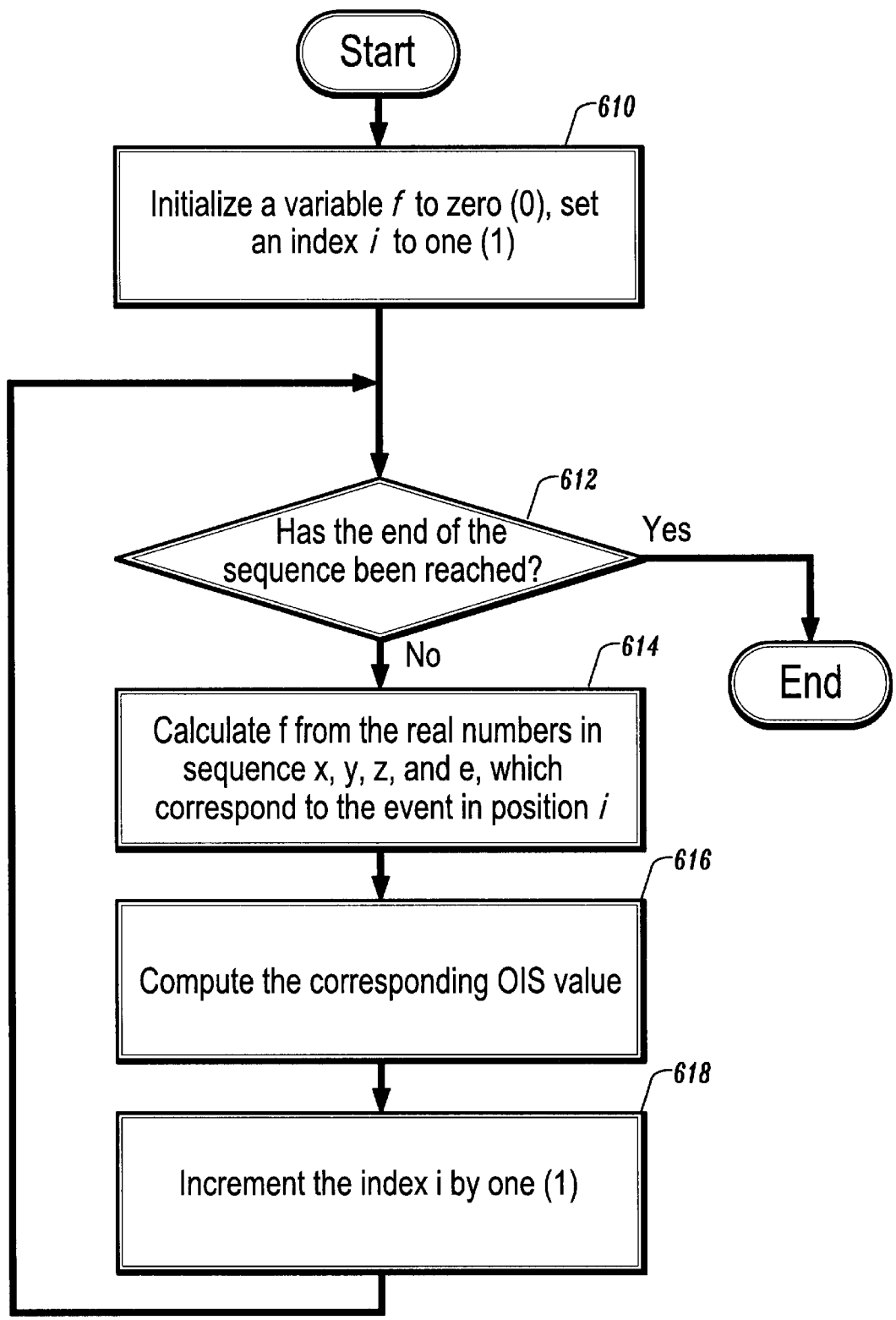
FIG. 6 is a flow diagram illustrating the process of computing the OIS value of a particular event at each position for a given period (step 412 of FIG. 4), according to an illustrative embodiment of the invention.

FIG. 6 is a flow diagram illustrating the process of computing the OIS value of a particular event at each position for a given period (step 412 of FIG. 4), according to an illustrative embodiment of the invention.

A variable f is initialized to zero (0) and an index i is set to one (1) (step 610). It is determined whether the end of the event sequence has been reached (step 612). If so, the process is terminated. Otherwise, f is calculated from the real number in sequence x, y, z, and e, which corresponds to the event in position i (step 614). Step 614 can also be represented as follows: f<-max{e($a_k$,l,i),f+x($a_k$,l,i)+y($a_k$,l,i)+z($a_k$,l,i). The corresponding OIS value is computed (step 616). Step 616 can also be represented as follows: OIS($a_k$,l,i)<-f-I($a_k$). The index i is incremented (step 616), and the process returns to step 612.

Figure 7:
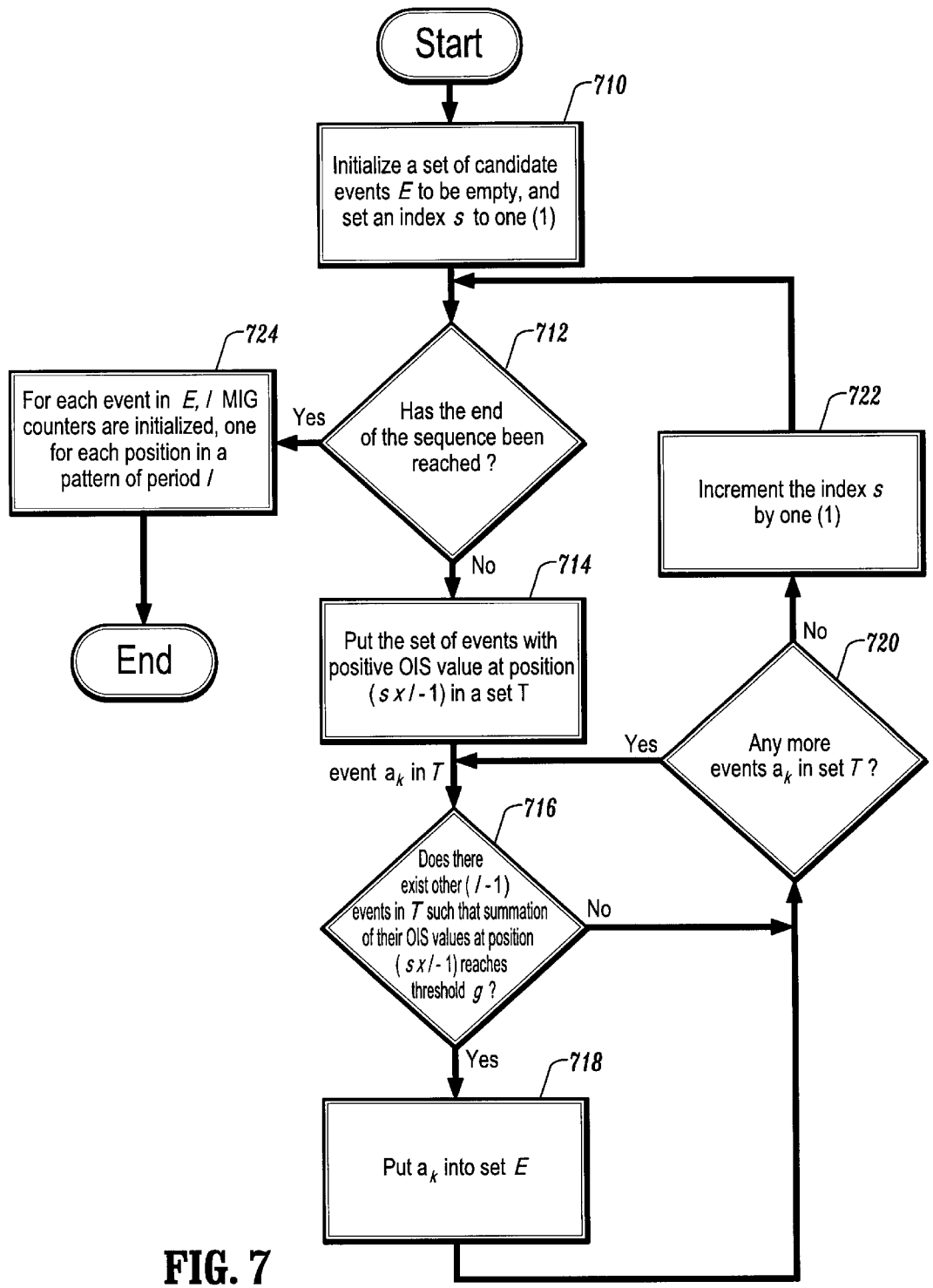
FIG. 7 is a flow diagram of a process for generating MIG counts based on OIS values for a given period (312 of FIG. 3), according to an illustrative embodiment of the invention.

FIG. 7 is a flow diagram of a process for generating MIG counts based on OIS values for a given period (step 312 of FIG. 3), according to an illustrative embodiment of the invention.

The set of candidate events E is initialized to be empty and an index s is set to one (1) (step 710). It is then determined whether the end of the event sequence has been reached (step 712). If so, then the process proceeds to step 724. Otherwise, the set of events with positive OIS value at position (s×l−1) are put into a set T (step 714). Step 714 can also be represented as follows: T(l,s)<-{$a_k$| OIS ($a_k$,l,s×l−1)>0}.

The following steps 716 through 718 are repeated for each event $a_k$ in T (i.e., $a_k \in$ T(l,s). At step 716, it is determined whether there exist another l−1 events in T such that the summation of their OIS value at position s×l−1 reaches the threshold g. If not, the method proceeds to step 720. Otherwise, $a_k$ is put into the set E (i.e., E(l)<-E(l)∪{$a_k$}) (step 718), and the method proceeds to step 720.

At step 720, it is determined whether there exists any more events ak in the set T. If so, the process returns to step 716. Otherwise, the process proceeds to step 722. At step 722, the index s is incremented by one (1), and the method returns to step 712.

At step 724, for each event in the set E, l MIG counters are initialized, one for each position in a pattern of period l.

Figure 8:
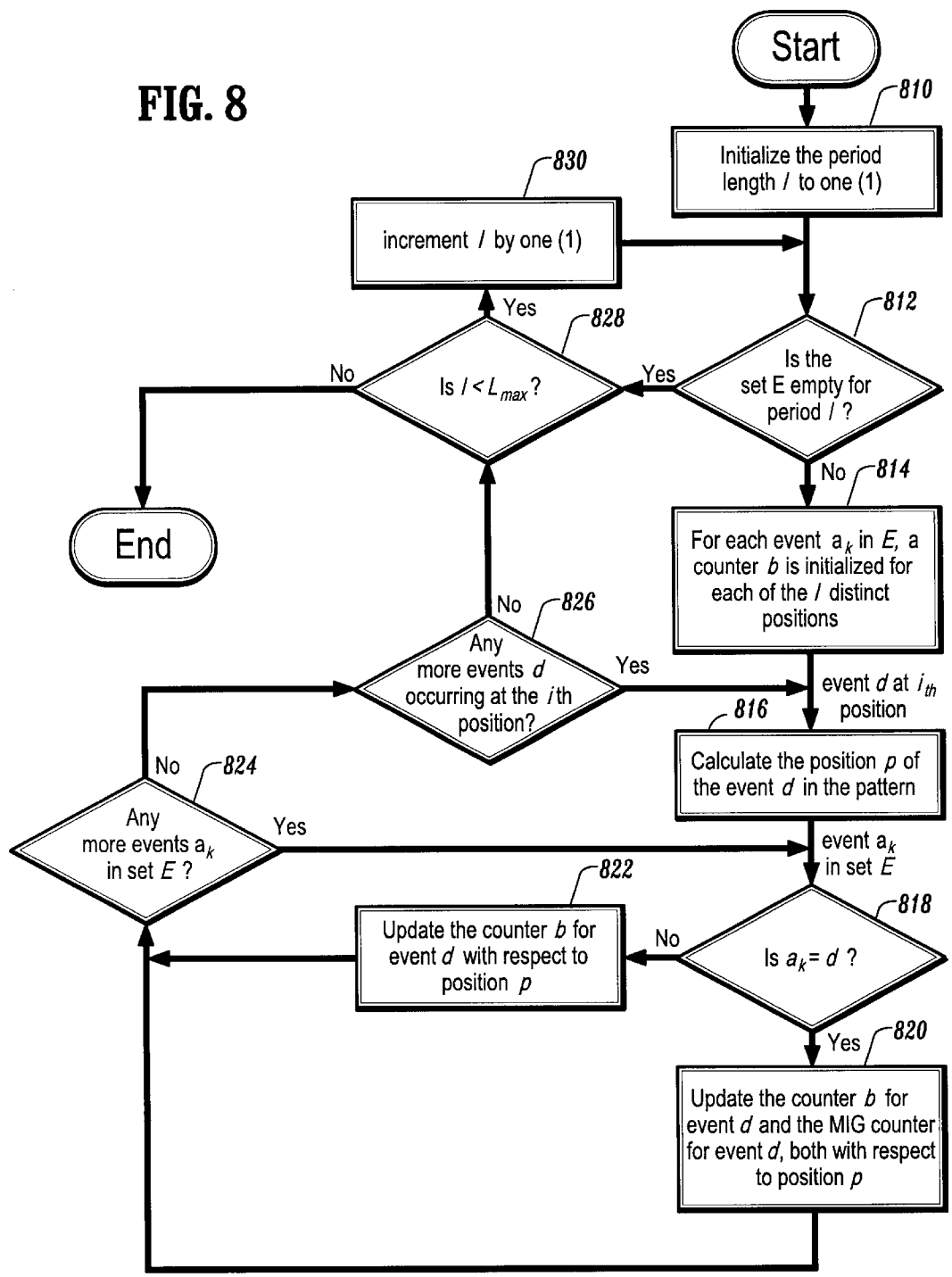
FIG. 8 is a flow diagram illustrating a process for computing MIG counts (step 214 of FIG. 2), according to an illustrative embodiment of the invention.

FIG. 8 is a flow diagram illustrating a process for computing MIG counts (step 214 of FIG. 2), according to an illustrative embodiment of the invention.

The period length l is initialized to one (1) (step 810). It is determined whether the set E is empty for period l (step 812). If so, then the process proceeds to step 828. Otherwise, for each event $a_k$ in E, a counter b (b($a_k$,l,p)) is initialized for each of the l distinct positions (1≤p≤l)(step 814).

The following steps 816 through 824 are repeated for each event d occurring at the ith. At step 816, for an event d occurring at the ith position in the sequence, the position p of the event d in the pattern is calculated.

The following steps 818 through 822 are repeated for each event $a_k$ in the set E. At step 818, it is determined whether $a_k$ is d. If so, the counter b for event d and the MIG counter for event d are both updated with respect to position p (step 820), and the process proceeds to step 824. Otherwise, only the counter b is updated (step 822), and the process proceeds to step 824. Step 820 can also be represented as follows:

$b(d,l,p) \leftarrow \max\{0, b(d,l,p)\} + I(d)$ $\mathrm{MIG}(d,l,p) \leftarrow \max\{b(d,l,p) - I(d), \mathrm{MIG}(d,l,p)\}$ Step 824 can also be represented as follows:

$b(d,l,p) \leftarrow \max\{0, b(d,l,p)\} - I(d)$

At step 824, is it determined whether there exists any more events $a_k$ in the set E. If so, the process returns to step 818. Otherwise, the process proceeds to step 826.

At step 826, it is determined whether there exists any more events d occurring at the $i_{th}$ position. If so, the process returns to step 816. Otherwise, the process proceeds to step 828.

At step 828, it is determined whether l is less than a pre-specified maximum period length ($L_{max}$). If not, then the process is terminated. Otherwise, the period l is incremented (step 830), and the process returns to step 812.

Figure 9:
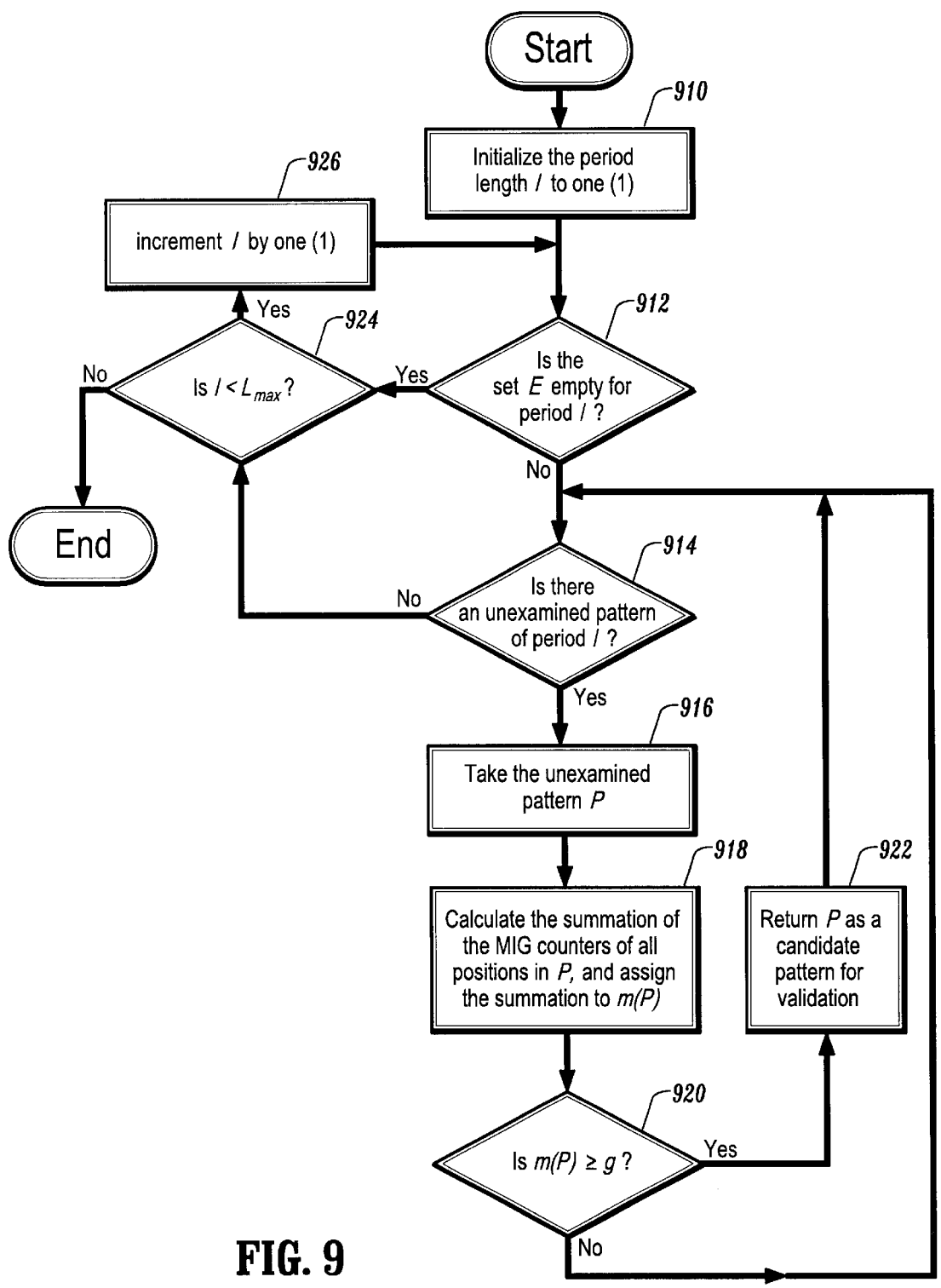
FIG. 9 is a flow diagram illustrating the process of generating candidate patterns from MIG counters (step 216 of FIG. 2), according to an illustrative embodiment of the invention.

FIG. 9 is a flow diagram illustrating the process of generating candidate patterns from MIG counters (step 216 of FIG. 2), according to an illustrative embodiment of the invention.

The period l is initialized to be one (1) (step 910). It is determined whether the set E is empty for period l (step 912). If so, the process proceeds to step 924. Otherwise, it is determined whether there is an unexamined pattern of period 1 (step 914). If not, the process proceeds to step 924. Otherwise, the unexamined pattern P is taken (step 916). The summation of the MIG counters of all positions in P is calculated and assigned to m(P) (step 918). Step 918 can also be represented as follows: m(P)<-$\Sigma_{1 \leq i \leq l}$MIG ($p_i$,l,i). It is determined whether m(P) reaches the threshold g (i.e., is m(P)>g) (step 920). If not, the process returns to step 914). Otherwise, the pattern P is taken as a candidate pattern for validation (step 922), and the process returns to step 914.

At step 924, it is determined whether 1<$L_{max}$. If so, the period l is incremented by one (1) (step 926), and the method returns to step 912. Otherwise, the process is terminated.

Figure 10:
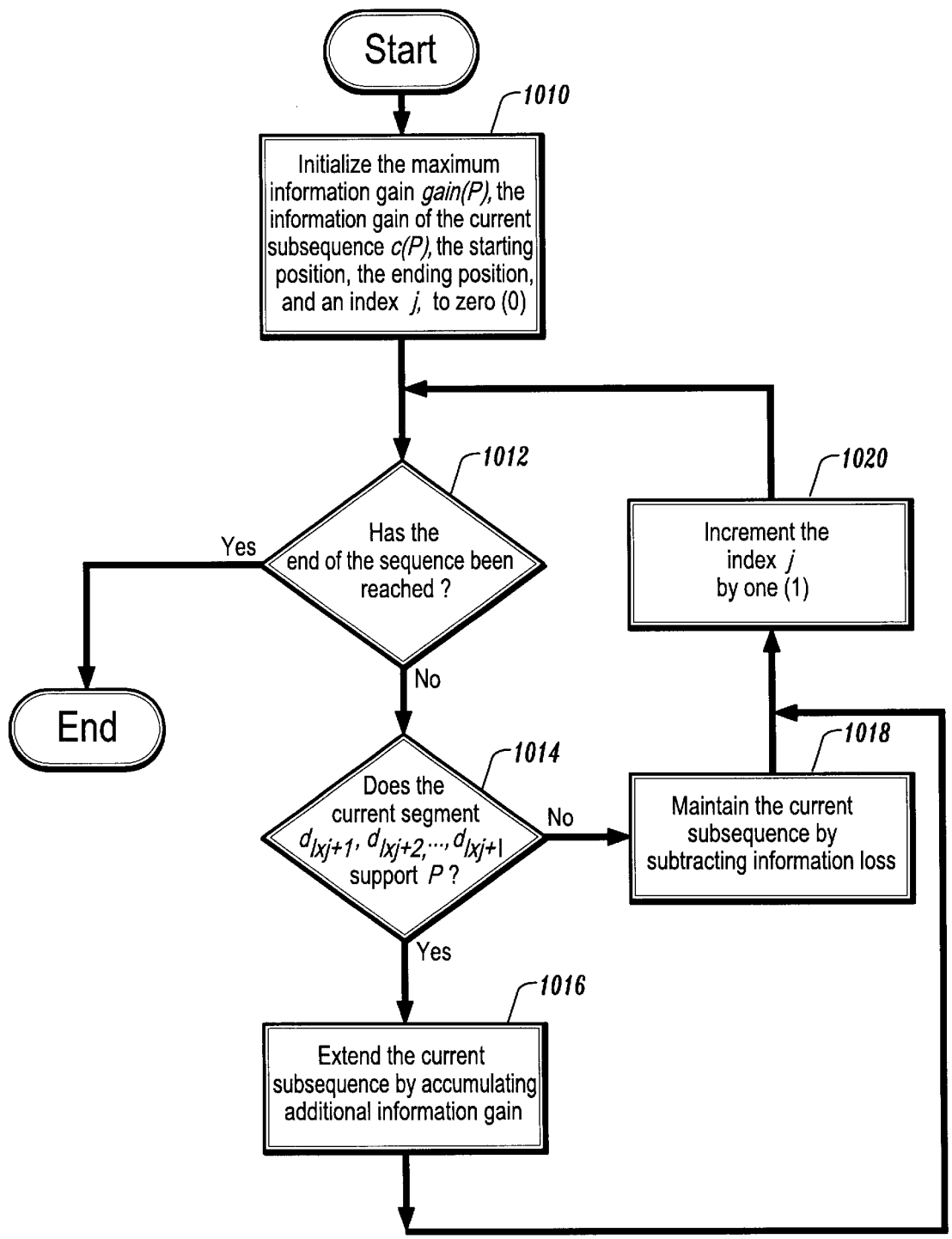
FIG. 10 is a flow diagram illustrating the process of validating a candidate pattern P (step 218 of FIG. 2), according to an illustrative embodiment of the invention.

FIG. 10 is a flow diagram illustrating the process of validating a candidate pattern P (step 218 of FIG. 2), according to an illustrative embodiment of the invention.

The maximum information gain (gain(P)), the information gain of the current subsequence c((P)), the starting position ($start_c$(P)), the ending position ($end_c$(P)), and an index j are set to zero (0) (step 1010). It is determined whether the end of the event sequence has been reached (step 1012). If so, the method is terminated. Otherwise, it is determined whether the current segment $d_{l \times j+1}$, $d_{l \times j+2}$, ..., $d_{l \times j+l}$ supports P (step 1014). If so, the current subsequence is extended by accumulating additional information gain (step 1016), and the method proceeds to step 1020. Otherwise, the Xcurrent subsequence is maintained by subtracting information loss (step 1018), and the process proceeds to step 1020. At step 1020, the index j is incremented, and then the process returns to step 1012.

Figure 11:
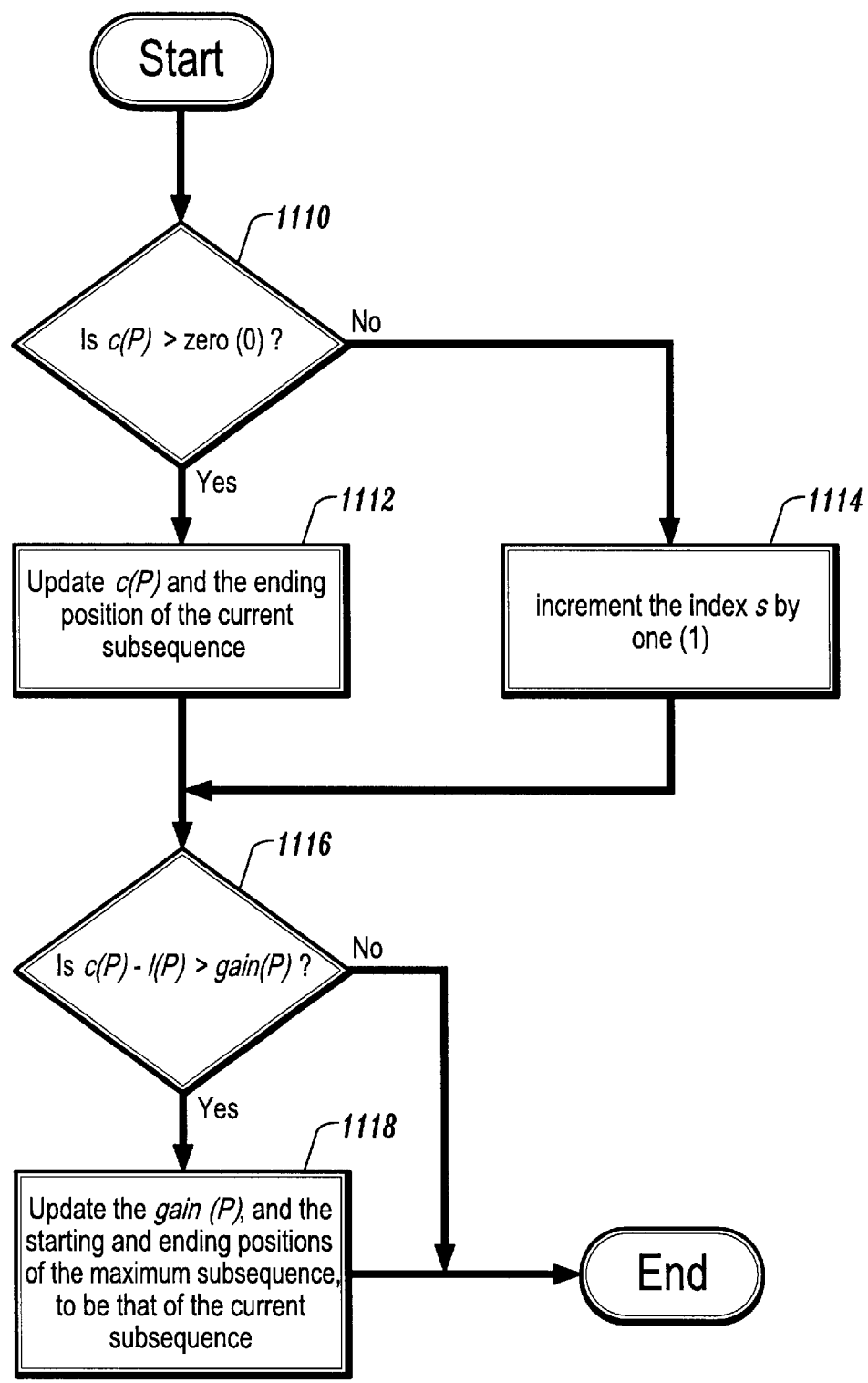
FIG. 11 is a flow diagram illustrating the process of extending the current subsequence to increase information gain (step 1016 of FIG. 10), according to an illustrative embodiment of the invention.

FIG. 11 is a flow diagram illustrating the process of extending the current subsequence to increase information gain (step 1016 of FIG. 10), according to an illustrative embodiment of the invention.

It is determined whether the information gain of the current subsequence (c(P)) is greater than zero (step 1110). If so, the information gain of the current subsequence (c(P)) and the ending position of the current subsequence ($end_c$(P) ) are updated (step 1112), and the process proceeds to step 1116. Otherwise, the information gain of the current subsequence (c(P)) and the starting ($start_c$(P)) and ending positions ($end_c$(P)) of the current subsequence are updated (step 1114), and the process proceeds to step 1116. Step 1112 can also be represented as follows:

$c(P) \leftarrow c(P) + I(P)$ $end_c(P) \leftarrow l \times j + l$

Step 1114 can also be represented as follows:

$$c(P) \leftarrow -I(P)$$

$$start_c(P) \leftarrow -l \times j + l$$

$$end_c(P) \leftarrow -l \times j + l$$

At step 1116, it is determined whether c(P)–I(P) is greater than the maximum information gain (gain(P)). If so, the maximum information gain (gain(P)) and the starting (start$_c$(P)) and ending positions (end$_c$(P)) of the maximum subsequence are updated to be that of the current subsequence (step 1118), and the process is terminated. Otherwise, the process is terminated. Step 1118 can also be represented as follows:

$$gain(P) \leftarrow -c(P) - I(P)$$

$$start_{gain}(P) \leftarrow -start_c(P)$$

$$end_{gain}(P) \leftarrow -end_c(P)$$

Figure 12:
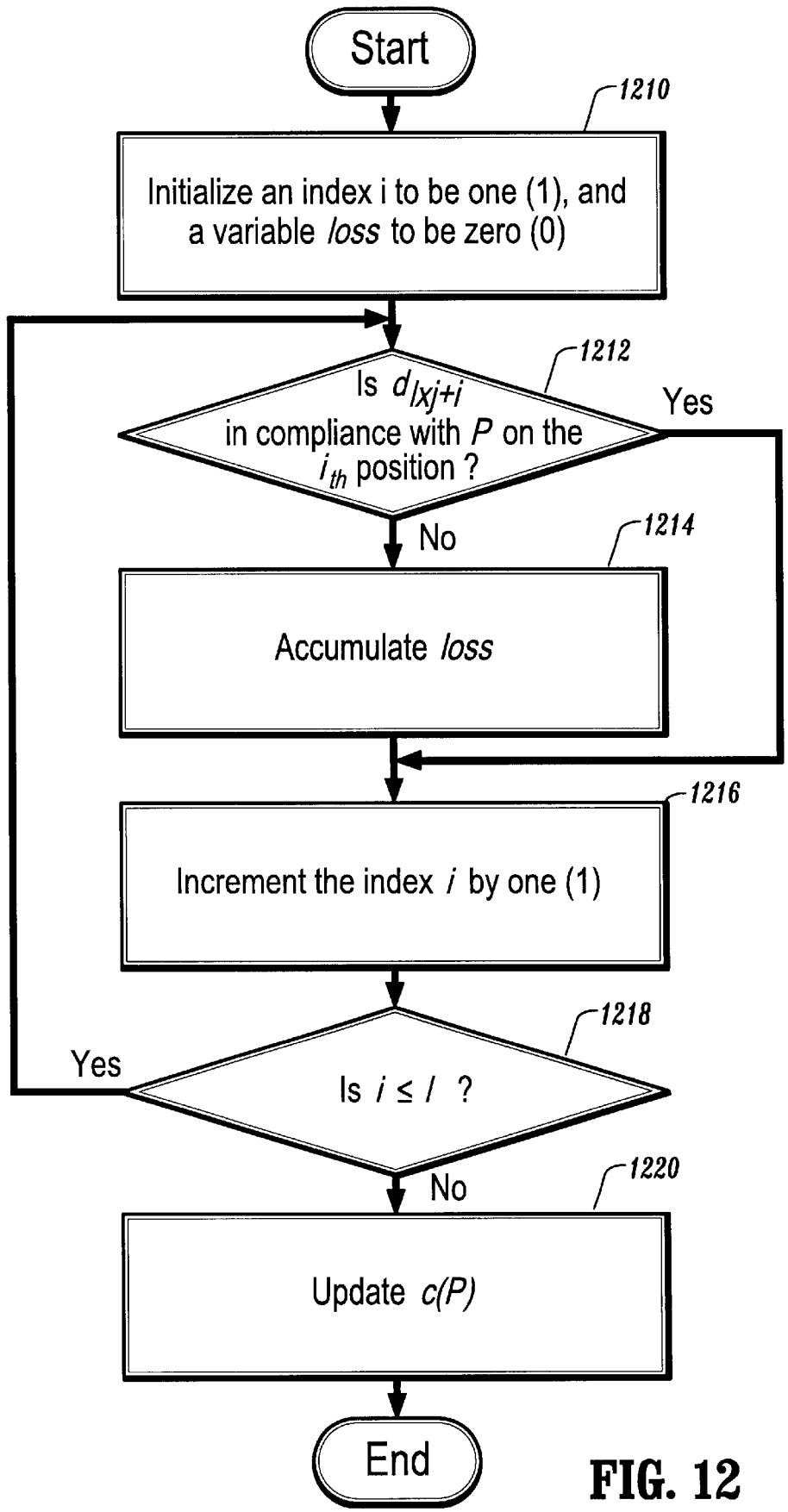
FIG. 12 is a flow diagram illustrating the process of maintaining the current subsequence by subtracting information loss (step 1018 of FIG. 10), according to an illustrative embodiment of the invention.

FIG. 12 is a flow diagram illustrating the process of maintaining the current subsequence by subtracting information loss (step 1018 of FIG. 10), according to an illustrative embodiment of the invention.

An index i is initialized to be one (1) and a variable loss is initialized to be zero (0) (step 1210). It is determined whether $d_{l \times j + i}$ is in compliance with P on the ith position (step 1212). If so, the process proceeds to step 1216. Otherwise, loss is accumulated (loss<–loss+I(p$_i$)) (step 1214), and the process proceeds to step 1216.

At step 1216, the index i is incremented. It is determined whether i≦l (step 1218). If so, the process returns to step 1212. Otherwise, the information gain of the current subsequence (c(P)) is updated (c(P)<–max{0,c(P)}–loss) (step 1220).

A brief description of the motivation behind the present invention will now be given. It is to be appreciated that a desirable metric for use in periodic pattern discovery should be a relative measurement which takes into account the frequency of occurrences of different events. In particular, we want to favor those patterns that would rarely occur by randomness given the occurrence frequency of involved events. In order to extract the patterns that are truly significant, the degree of significance should be a measurement of disparity from prior expectation and should intuitively have the following properties:

(a) For a given pattern P, each repetition would have a positive contribution to the significance of P. Consequently, the significance of a pattern is a monotonic increasing function of the number of occurrences if other conditions remain unchanged.

(b) If the pattern consists of more rare events, it's occurrence should have a higher degree of significance. In other words, the significance of a pattern should be a monotonic decreasing function of the joint probability of involved events.

(c) If there is less noise interleaved in a list of repetitions of a pattern, then the corresponding event subsequence would produce a higher degree of significance. In addition, noise can be measured by the difficulty in obtaining the right replacement event(s) in order to "mend" to perfect repetitions.

The absence of a frequent event A would have less impact to the overall significance than that of a less frequent event (e.g., B) because it would be easier to obtain an occurrence of A than that of B.

Since the system/user behavior may change over time, many patterns may only be valid for a period of time. The degree of significance (i.e., information gain) of a pattern may be diluted if we only consider the entire event sequence. In addition, a user may be interested not only in a significant pattern, but also where and/or when the pattern is significant. In the web server example provided hereinabove, the workload on these servers may present a significant pattern within a certain time period, e.g., 8am to 5pm each weekday. The identification of a significant pattern in a subsequence is of great importance in many applications. However, most previous research focused on discovering patterns that are significant over the entire data sequence.

A summary of the invention will now be provided. The invention provides a method for mining partial periodic patterns. In particular, the method identifies a pattern and subsequence combination, wherein the pattern is significant within the subsequence. The new metrics information and information gain are provided to measure the knowledge encapsulated in a pattern and the degree of significance of the pattern exhibited by a subsequence of data, respectively. The length of a pattern can be arbitrary, e.g., from a few events to several thousands, and is to be discovered by the mining method of the invention. Since the downward closure does not hold with information gain, an efficient method is provided for mining significant patterns and associated subsequences based on the triangle inequality that is preserved by the information gain metric. First, the significant patterns involving one event are discovered. Next, candidate patterns involving multiple events are generated based on the triangle inequality. Finally, all candidate patterns are validated and for each pattern which is significant, the corresponding subsequence containing the pattern is also identified.

Although the illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for mining partial periodic patterns in an event sequence, each pattern comprising a list of events from the event sequence, the method comprising the steps of:

identifying at least one subsequence of the event sequence and at least one pattern in the at least one subsequence, such that an information gain of the at least one subsequence with respect to the at least one pattern exceeds a predefined threshold; and storing at least one of the at least one pattern and the at least one subsequence.

2. The method according to claim 1, wherein each of the events in a given pattern, is either distinct or non-distinct, and each non-distinct event matches any of the distinct events.

3. The method according to claim 1, further comprising the step of determining the information gain of the at least one subsequence with respect to the at least one pattern, said determining step comprising the steps of:

dividing the at least one subsequence into contiguous segments, wherein each contiguous segment is a same length as the at least one pattern;

for each contiguous segment:

calculating the information gain of the contiguous segment, when all of the events of the contiguous segment match the corresponding events of the at least one pattern;

calculating the information loss of the contiguous segment, when at least one of the events of the contiguous segment does not match the corresponding event of the at least one pattern; and calculating the information gain of the at least one subsequence, by summing the information gain and the information loss of each of the contiguous segments comprised therein.

4. The method according to claim 3, wherein said step of calculating the information gain of each of the contiguous segments comprises the steps of:

assigning an information value to the at least one pattern; and assigning an information loss to at least one deviated pattern from the at least one pattern.

5. The method according to claim 4, wherein said step of assigning an information value to the at least one pattern comprises the steps of:

determining an information value of each of the events in the at least one pattern; and summing the information values of each of the events in the at least one pattern.

6. The method according to claim 5, wherein said step of determining the information value of each of the events in the pattern comprises the step of determining a probability of occurrence in the event sequence of each of the events in the pattern.

7. The method according to claim 1, further comprising the step replacing at least one of the events in the at least one pattern, to obtain a higher degree of repetitiveness of the events in the at least one pattern with respect to the at least one subsequence.

8. The method according to claim 1, wherein the at least one subsequence maximizes the information gain of the at least one pattern with respect to any other subsequences of the event sequence.

9. The method according to claim 1, wherein said step of identifying the at least one subsequence comprises the step of identifying a subsequence of the event sequence that maximizes the information gain with respect to a pattern contained therein.

10. The method according to claim 1, wherein said method is implemented by a program storage device readable by machine, tangibly embodying a program of instructions executable by the machine to perform said method steps.

11. A method for mining partial periodic patterns in an event sequence, each pattern comprising a list of events from the event sequence, the method comprising the steps of:

identifying singular patterns in the event sequence, wherein each singular pattern has only one position filled by one of the events in the event sequence;

identifying complex patterns in the event sequence, wherein each complex pattern has more than one position filled by one of the events in the event sequence;

identifying the complex patterns and subsequences of the event sequence that comprise the complex patterns, such that an information gain of each of the subsequences with respect to the complex pattern comprised therein exceeds a predefined threshold; and storing at least one of the complex patterns and the subsequences that contain the complex patterns.

12. The method according to claim 11, wherein a period of each of the candidate complex patterns is one of arbitrary and limited to a pre-specified maximum period length.

13. The method according to claim 11, further comprising the steps of:

identifying the singular patterns and subsequences of the event sequence that comprise the singular patterns, such that an information gain of each of the subsequences with respect to the singular pattern comprised therein exceeds a predefined threshold; and storing at least one of the singular patterns and the subsequences that contain the singular patterns.

14. The method according to claim 11, further comprising the step of respectively identifying the event subsequences that maximize the information gain for at least some of the singular and complex patterns.

15. The method according to claim 11, wherein said step of identifying the singular patterns comprises the steps of:

for each singular pattern, computing an optimal information surplus (OIS) of each of the events in the singular pattern with respect to each possible period of the singular pattern in a given subsequence of the event sequence;

computing a maximum information gain (MIG) of each of the singular patterns; and identifying at least one subsequence of the event sequence and at least one singular pattern in the at least one subsequence, such that an information gain of the at least one subsequence with respect to the at least one singular pattern exceeds a predefined threshold.

16. The method according to claim 15, wherein the step of computing the optimal information surplus (OIS) comprises the steps of:

for a given event $a_k$ and a given period l:

transforming the event sequence into a sequence X of real numbers, wherein each real number in the sequence X represents the information loss associated with each position in the event sequence;

transforming the event sequence into a sequence Y of real numbers, wherein each real number in the sequence Y represents the information gain associated with each position in the event sequence;

transforming the event sequence into a sequence Z of real numbers, wherein each real number in the sequence Z represents the information adjustment associated with each position in the event sequence;

transforming the event sequence into a sequence E of real numbers, wherein each real number in sequence E represents a number of occurrences of the given event $a_k$ within the previous l positions; and computing the optimal information surplus of each of the events in the event sequence from the sequences X, Y, Z, and E.

17. The method according to claim 13, wherein the step of identifying the singular patterns further comprises the steps of:

for a given position in the event sequence:

identifying a set T of events, wherein each event in the set T has a positive optimal information surplus for the given position;

identifying a set E of events, wherein each event in the set E is in a singular pattern of period l, the singular pattern of period l being contained in a containing subsequence such that an information gain of the containing subsequence with respect to the singular pattern of period l exceeds the predefined threshold;

for each of the events in the set E, initiating a MIG counter for an event-position combination.

18. The method according to claim 17, wherein said step of identifying the set E comprises the step of sequentially evaluating each of the events in the set T.

19. The method according to claim 18, wherein said step of
sequentially evaluating each of the events in the set T comprises the step of inserting an event currently being evaluated into the set E, when there exists l−1 events in the set T such that the sum of the optimal information surplus of the l−1 events and an optimal information surplus of the event currently being evaluated exceeds a predefined threshold.

20. The method according to claim 15, wherein said step of computing the maximum information gain (MIG) of each of the singular patterns comprises the step of:
for a given singular pattern having a period l:
transforming the event sequence into a sequence of real numbers Q, wherein each real number in the sequence Q represents one of the information gain and the information loss associated with each segment of l events in the event sequence;
computing the information gain associated with event subsequences of the event sequence; and
identifying a subsequence that maximizes the information gain.

21. The method according to claim 11, wherein said step of identifying complex patterns comprises the step of:
identifying a minimum common superpattern (MCSP) in a set D of singular patterns having a same period, the minimum common superpattern being such that each of the singular patterns in the set D are a subpattern of the minimum common superpattern and there does not exist another subpattern AP of the minimum common superpattern such that each of the singular patterns in the set D is also a subpattern of the other subpattern AP.

22. The method according to claim 21, wherein said step of identifying complex patterns further comprises the step of:
identifying the minimum common superpattern as a complex pattern, when a sum of maximum information gain values of the singular patterns in the set D exceed a predefined threshold.

23. The method according to claim 11, wherein said method is implemented by a program storage device readable by machine, tangibly embodying a program of instructions executable by the machine to perform said method steps.

24. A method for mining partial periodic patterns in an event sequence, each pattern comprising a list of events from the event sequence, the method comprising the steps of:
specifying a minimum information gain for a pattern of events with respect to a subsequence of the event sequence that comprises the pattern;
identifying patterns of events in the event sequence and subsequences of the event sequence that comprise the patterns; and
storing only the patterns and subsequences such that the information gain of the stored patterns with respect to the stored subsequences exceeds a predefined threshold.

25. The method according to claim 24, wherein said method is implemented by a program storage device readable by machine, tangibly embodying a program of instructions executable by the machine to perform said method steps.

* * * * *